US007403606B1

(12) United States Patent
Vasarainen

(10) Patent No.: US 7,403,606 B1
(45) Date of Patent: Jul. 22, 2008

(54) GENERAL PROTOCOL FOR SERVICE CONTROL POINT

(75) Inventor: Juha Vasarainen, Piikkio (FI)

(73) Assignee: Nokia Corporation, Espoo (FI)

( * ) Notice: Subject to any disclaimer, the term of this patent is extended or adjusted under 35 U.S.C. 154(b) by 1377 days.

(21) Appl. No.: 09/906,372

(22) Filed: Jul. 16, 2001

Related U.S. Application Data

(63) Continuation of application No. PCT/EP99/00178, filed on Jan. 14, 1999.

(51) Int. Cl.
*H04M 7/00* (2006.01)
(52) U.S. Cl. ............. 379/229; 379/221.08; 379/221.09; 379/221.12
(58) Field of Classification Search .................. 379/229, 379/221.08, 221.09, 221.12
See application file for complete search history.

(56) References Cited

U.S. PATENT DOCUMENTS

| 5,629,974 | A | 5/1997 | Rajala et al. | |
| 6,243,457 | B1 * | 6/2001 | Lin et al. | 379/230 |
| 6,714,633 | B1 * | 3/2004 | Lehtinen | 379/201.12 |
| 6,721,395 | B2 * | 4/2004 | Martinez | 379/45 |

FOREIGN PATENT DOCUMENTS

EP 0873026 A1 10/1998

WO WO 98/51097 11/1998

OTHER PUBLICATIONS

International Search Report for PCT/EP99/00178.

* cited by examiner

*Primary Examiner*—Rasha S. Al-Aubaidi
(74) *Attorney, Agent, or Firm*—Squire, Sanders & Dempsey L.L.P.

(57) ABSTRACT

The present invention discloses a general protocol for a service control point (SCP) in a network system. The network system comprises at least one first type network element (SCP) and at least one second type network element (SSP) for transmitting messages to the first type network elements (SCP), respectively using a specific protocol. The first type network elements (SCP) are able to process the received protocol-specific messages and to transmit messages to said second type network elements by using service logic programs (SLP). In addition, the system comprises a definition means (1) for defining protocol definitions related to one message into a general protocol definition for the message, and for providing general protocol definitions for all possible transmitted messages for each of the first type network elements (SCP). Each of the first type network elements (SCP) in the system comprises a conversion means (2) for converting the provided general protocol definitions into one general message set that is used in the respective first type network element (SCP), and a selection means (3) for selecting converted protocol definitions in the converted general protocol definition for a received protocol-specific message and for a message to be transmitted by the respective first type network element out of the general message set, and for providing the selected converted protocol definitions for the received message to the service logic programs (SLP) for processing the received message, and for transmitting the selected converted protocol definitions for the message to be transmitted.

31 Claims, 9 Drawing Sheets

GENERAL PROTOCOL FOR SERVICE CONTROL POINT

This application is a continuation of international application serial number PCT/EP99/00178, filed 14 Jan. 1999.

FIELD OF THE INVENTION

The present invention relates to a network system and a method for processing protocol-specific messages in a network element, such as a service control point, and in particular to a general protocol for a service control point.

BACKGROUND OF THE INVENTION

In an intelligent network system, Service Control Point (SCP) network elements provide a platform for executing Service Logic Programs (SLP) to implement value-added services in the intelligent network system. Other network elements in the intelligent network system, so called Service Switching Point (SSP) network elements are linked for call processing purposes to the SCP network elements.

In particular, the SCP network elements handle messages, i.e. operation instructions, which are communicated from the SSP network elements. However, the SSP network elements use different signaling protocols such as Signaling System No. 7 (SS7) protocols for transmitting/receiving the messages towards/from the SCP network elements. Therefore, the SCP network elements must be able to process the different signaling protocols. For example, these protocols can be the Intelligent Network Application Protocol (INAP) with various manufacturer specific extensions or versions such as fixed network extensions and mobile network extensions, the Mobile Application Protocol (MAP) and the Customized Application Protocol for Mobile Networks (CAMEL). Hence, the SCP network elements must be able to handle phone calls in mobile networks and in fixed networks.

In processing the messages, the SCP network elements use the service logic programs which, for example, can be programmed by means of a Service Logic Execution Language (SLEL) used in Hewlett Packard SCP implementation.

Every new protocol or protocol version is imported to the SCP network elements as a new message set. Message sets are made by converting protocol definitions such as ASN.1 definitions of the protocols using a Message Set Compiler (MSC) or an other ASN.1 compiler. Different message sets are created for the different protocols or protocol versions, respectively. The different message sets are separated by message set name and version number. The message set name and version number are also used in service logic program code in order to indicate which service logic program belongs to which message set. The service logic programs use this information to select the appropriate encoding and decoding routines for the message sets.

FIG. 9 shows the conventional architecture in an SCP network element, in which service logic programs registered to different protocols X and Y communicate with lower protocol layers such as Transaction Capabilities Application Parts (TCAP), etc.

Thus, if a service logic program is registered to a message set named INAP which message set is not installed in the respective SCP network element, it is not possible to compile the service logic program in the SCP network element.

Furthermore, if the number or version of protocols processed in the SCP network elements changes, the service logic programs registered to the protocols are immediately affected. Or if an old protocol is removed from the SCP network elements, the code of the service logic programs registered to this protocol has to be modified and recompiled.

Since the amount of services in the SCP network elements is very high, changes or modifications to the service logic programs require a lot of work.

SUMMARY OF THE INVENTION

According to the present invention, this object is achieved by a network system which comprises at least one network element of a first type (SCP) and at least one network element of a second type (SSP) for transmitting messages to the first type network elements, wherein each of the second type network elements uses a specific protocol of a plurality of protocols for transmitting the messages. In this system, the first type network elements are able to process the received protocol-specific messages and to transmit messages to the second type network elements by using service logic programs (SLP) which are included in each of the first type network elements. The system further comprises a definition means for defining protocol definitions of the plurality of protocols, which protocol definitions are related to one message, into a general protocol definition for the message, and for providing general protocol definitions for all possible messages transmitted by the second type network elements and the first type network elements for each of the first type network elements. In addition, each of the first type network elements in the system comprises a conversion means for converting the provided general protocol definitions into one general message set that is used in the respective first type network element, and a selection means for selecting converted protocol definitions in the converted general protocol definition for a received protocol-specific message and for a message to be transmitted by the respective first type network element out of the general message set, and for providing the selected converted protocol definitions for the received message to said service logic programs for processing the received message, and for transmitting the selected converted protocol definitions for the message to be transmitted.

Furthermore, according to the present invention, the above-mentioned object is achieved by a method for processing protocol-specific messages in a network element of a first type (SCP), wherein messages are transmitted to the first type network element by at least one network element of a second type (SSP), each of the second type network elements using a specific protocol of a plurality of protocols for transmitting the messages. Using service logic programs (SLP) which are included in the first type network element, the protocol-specific messages can be processed by the first type network element and messages can be transmitted by the first type network element to the second type network elements. This method comprises a definition step, in which protocol definitions of the plurality of protocols, which protocol definitions are related to one message, are defined into a general protocol definition for the message, and a provision step, in which general protocol definitions for all possible messages transmitted by the second type network elements and the first type network element are provided for the first type network element. In addition, the method comprises a conversion step, in which the provided general protocol definitions are converted into one general message set that is used in the first type network element, a selection step, in which converted protocol definitions in the converted general protocol definition for a received protocol-specific message and for a message to be transmitted by the first type network element are selected out of the general message set, and a provision step, in which the selected converted protocol definitions for the received message are provided to the service logic programs for processing the received message and in which the selected converted protocol definitions for the message to be transmitted are transmitted.

According to the present invention, the service logic programs register only to the general message set. Changes in the general message set are not visible to the service logic programs. From the viewpoint of the service logic programs, the number of used protocols does not change and the protocol name is stable.

Further developments of the present invention are defined in the respective appended subclaims.

In the following, a preferred embodiment of the present invention is described by taking into account the accompanying drawings.

DETAILED DESCRIPTION OF THE PREFERRED EMBODIMENT

Figure 1:
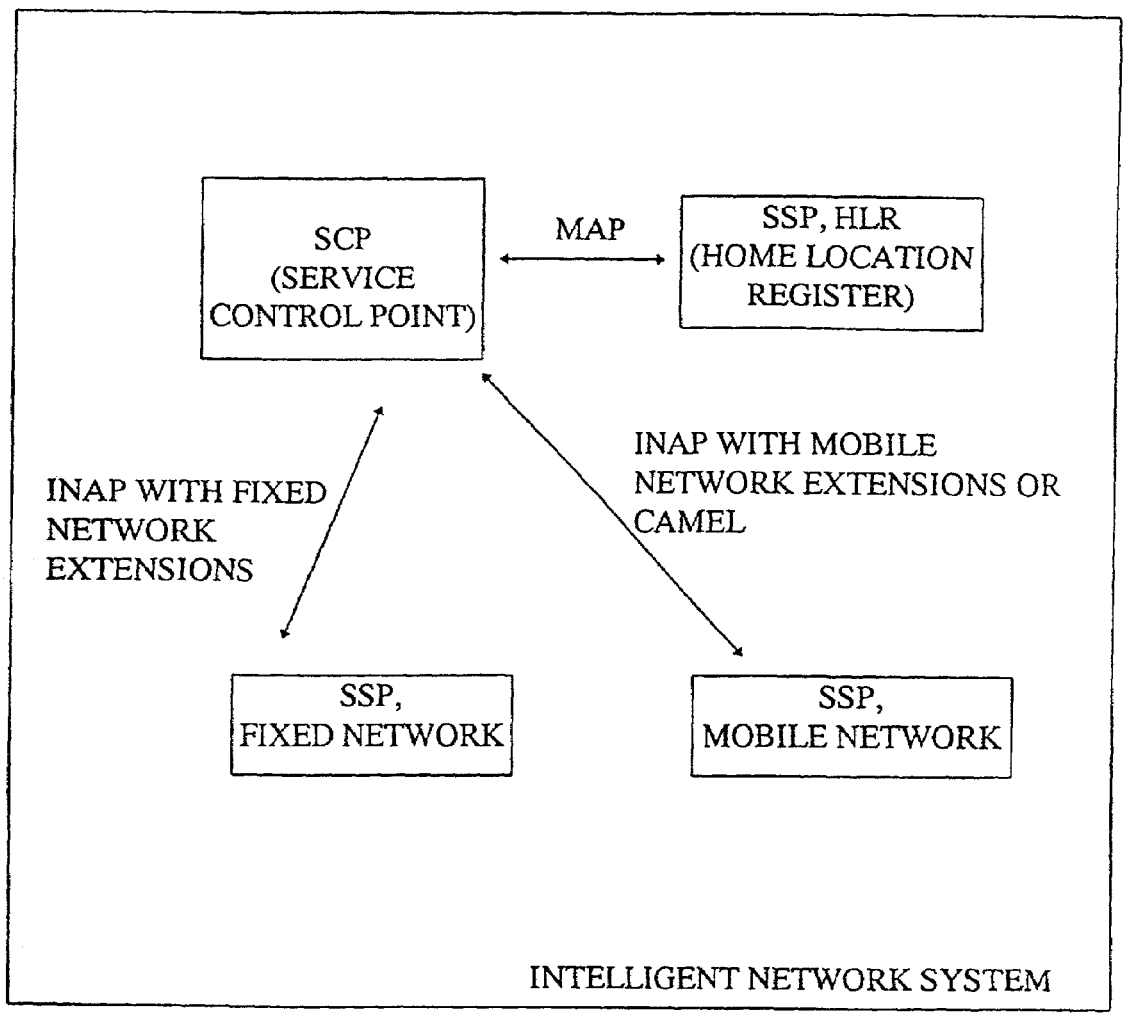
FIG. 1 shows a schematic configuration of an intelligent network system.

FIG. 1 shows a schematic configuration of an intelligent network system which comprises at least one network element of a first type (referred to in the following as SCP (Service Control Point) network element) and at least one network element of a second type (referred to in the following as SSP (Service Switching Point) network element). The SSP network elements transmit/receive messages to/from the SCP network elements, for which purpose there are used a plurality of different protocols such as SS7 (Signaling System No. 7) protocols and different versions thereof. As is shown in FIG. 1, among these protocols there are INAP (Intelligent Network Application Protocol) for fixed network extensions and for mobile network extensions, CAMEL (Customized Application Protocol for Mobile Networks) and MAP (Mobile Application Protocol) as examples for such SS7 protocols.

Figure 2:
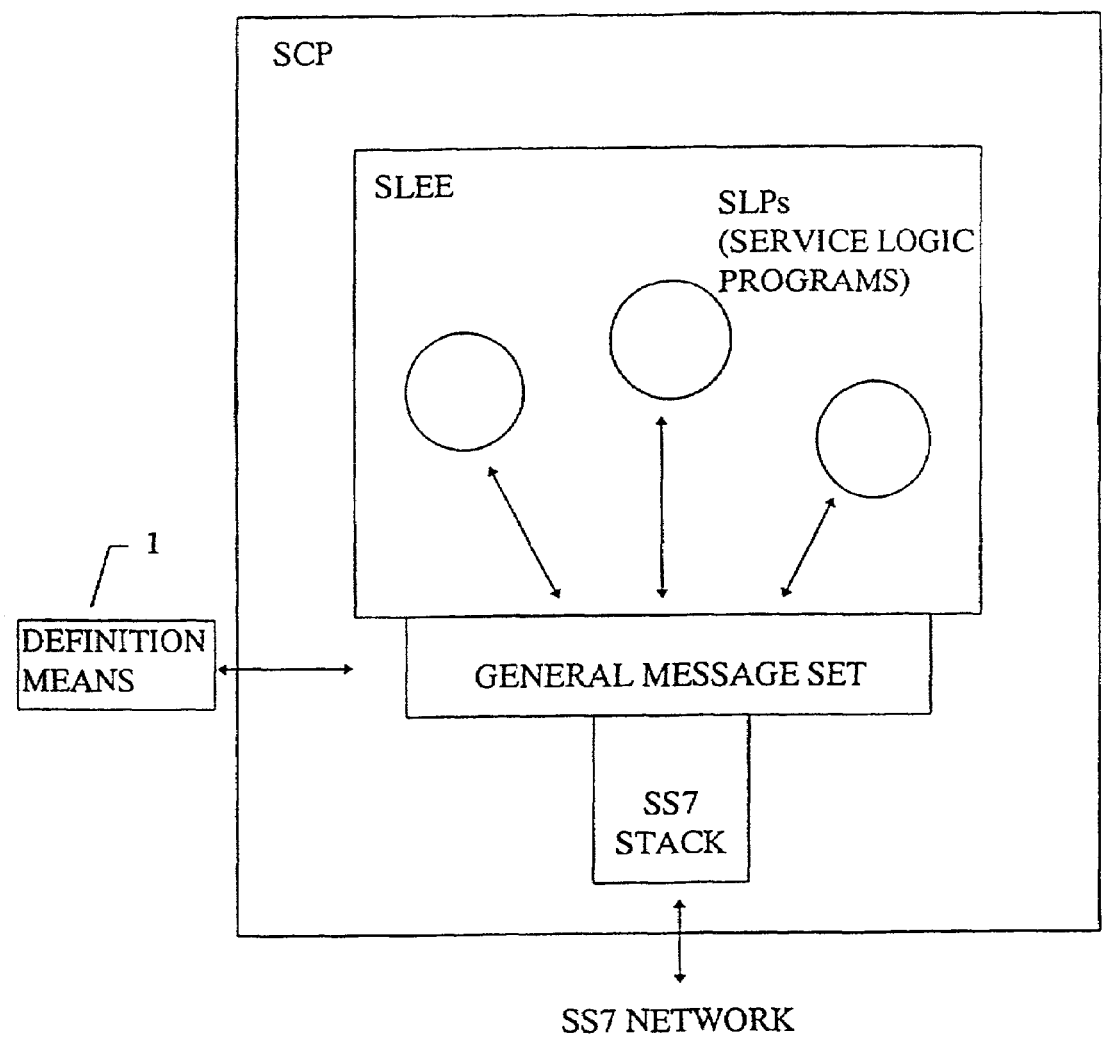
FIG. 2 shows an internal structure of an SCP network element according to a preferred embodiment of the present invention.

FIG. 2 shows the internal structure of one of the SCP network elements which, according to a specific implementation in an arbitrary example, is based on HP (Hewlett Packard) platform. Connectivity to the SS7 network, i.e. the SSP network elements operating according to SS7 protocols, is provided by an SS7 stack.

According to FIG. 2, service logic programs (SLPs) are registered to a general message set. The service logic programs which, for example, can be created using a service logic execution language (SLEL) in Hewlett Packard implementation are located in a service logic execution environment (SLEE). Service logic programs can of course be executed in different environments which depends on the language used in programming the service logic programs and on the hardware in which the SCP network element is located.

In FIG. 2 there is also shown a definition means 1 communicating with the SCP network element, the operation of which will be described in the following.

The service logic programs shown in FIG. 2 are general, protocol-independent service logic programs which are registered to only one general message set.

In the following, the creation of the general message set is described by referring to FIG. 3.

In general, protocol definitions such as ASN.1 definitions provided by the definition means 1 shown in FIG. 2 to the SCP network elements are converted in the SCP network elements by using a conversion means 2, i.e. a protocol definition compiler such as a Message Set Compiler (MSC) or an other ASN.1 compiler. The ASN.1 compiler 2 uses the ASN.1 description of a protocol as an input, and outputs a file which includes the encoding and decoding routines for the protocol.

Figure 3:
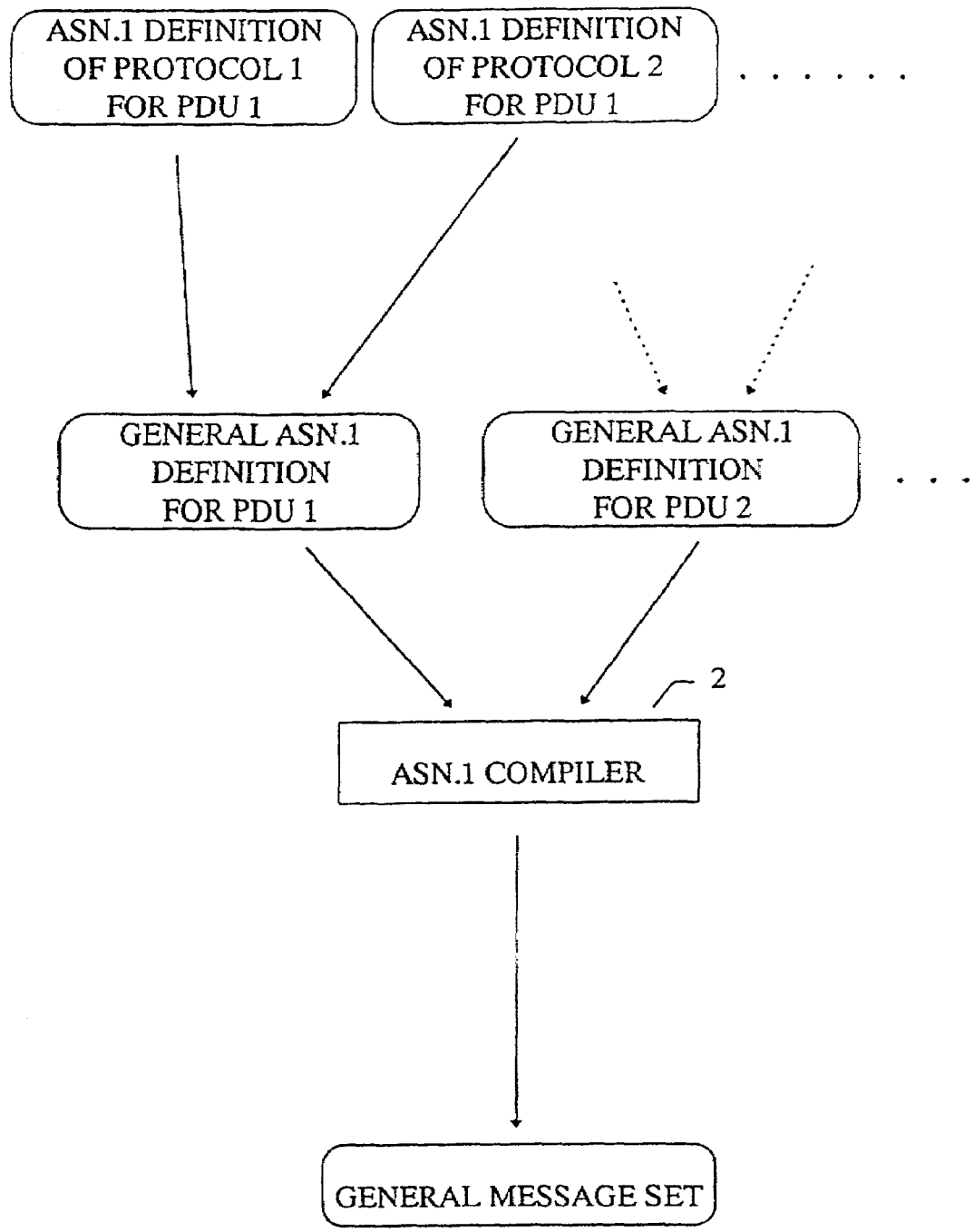
FIG. 3 shows a process for creating a general message set for the SCP network element according to the preferred embodiment of the present invention.

In order to obtain the general message set as shown in FIG. 3, general protocol definitions for all possible PDUs (protocol data units or messages) which are used in SCP "outside world" communication must be provided.

This is accomplished by the definition means 1. In the definition means 1, several ASN.1 protocol definitions are combined into one definition. This is shown in FIG. 3, in which several ASN.1 definitions of a plurality of protocols 1, 2, . . . for one PDU or message are defined in a general ASN.1 definition for this PDU.

Then, the general ASN.1 definitions for all possible PDUs 1, 2, . . . are supplied to the SCP network elements in which they are converted into the general message set via the ASN.1 compiler 2 or an other ASN.1 compiler and are rendered operative at the SCP network elements.

Annex 1 shows an example of a general ASN.1 definition for one PDU for several protocol versions. In this general definition, INAP message (PDU) "ConnectToResource" is defined for a mobile network and a fixed network, i.e. there are definitions for the mobile network and definitions for the fixed network. In addition, some definitions in the general definition are common for both protocols.

As can be seen from this example, the message name "ConnectToResource" exists in INAP for fixed network and in INAP for mobile network. That is, same message names (PDU names) can exist in several protocols or protocol versions.

Thus, a tool is required for separating the messages and for selecting the appropriate ASN.1 definitions in the general ASN.1 definition for the respective message out of the general message set, which is transmitted to or from an SSP network element using a specific protocol or protocol version.

Figure 4:
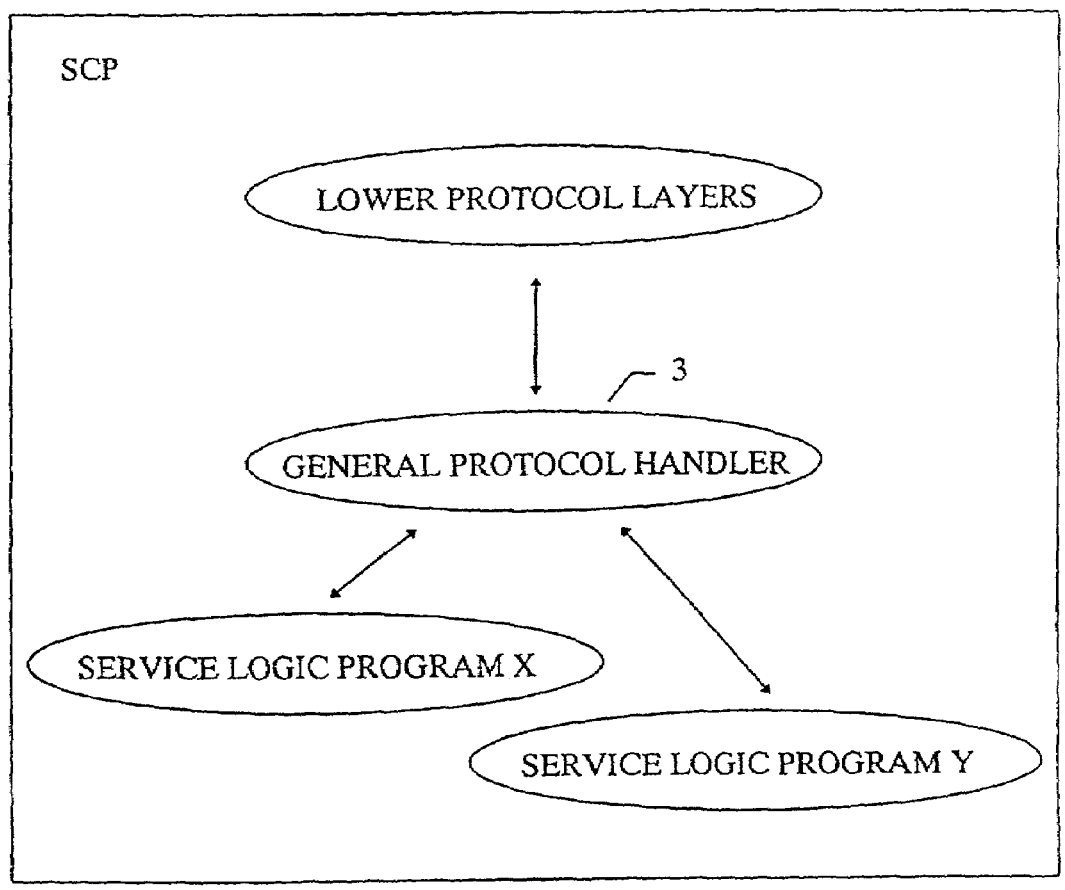
FIG. 4 shows an architecture in the SCP network element according to the preferred embodiment of the present invention.

As can be seen from FIG. 4, this is accomplished by a general protocol handler 3 which is included in each of the SCP network elements and communicates with lower protocol layers and the service logic programs in the respective SCP network element. According to FIG. 4, the service logic programs X and Y register to only one message set and are selected by the general protocol handler 3 which will be described in detail below.

For separating the messages, the general protocol handler 3 provides an identifier such as a prefix for the converted ASN.1 definitions in the general message set. Since the filling of the PDUs, i.e. the filling of the general ASN.1 definitions is effected by the general protocol handler 3, the identifier is not visible for the service logic programs.

Figure 6:
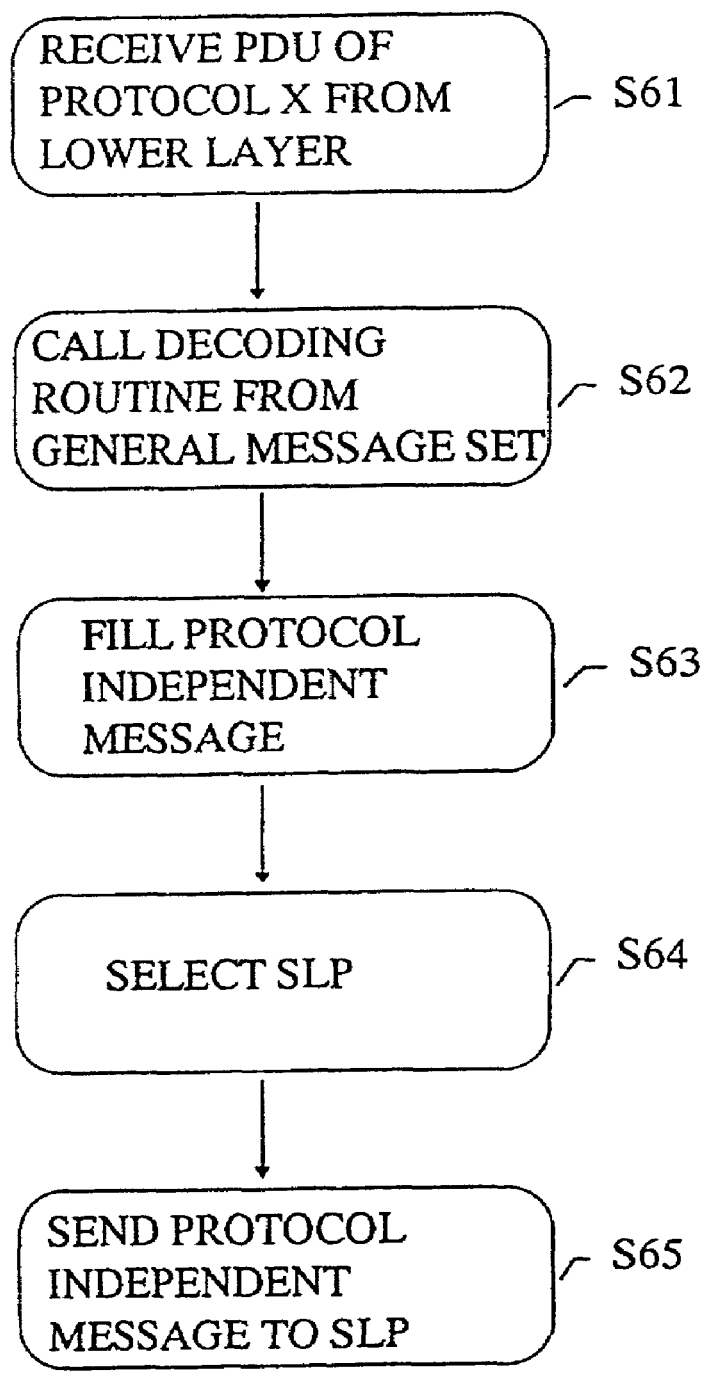
FIG. 6 shows a flowchart illustrating the process when the SCP network element according to the preferred embodiment of the present invention receives a message from an SSP network element.

With respect to FIG. 6, in receiving a protocol-specific message (a PDU of a protocol X) (S61) transmitted by an SSP network element, from a lower layer, the general protocol handler 3 calls a decoding routine corresponding to the protocol X from the general message set (S62) and fills the protocol independent general ASN.1 definition corresponding to the decoding output (S63). That is, the protocol handler selects the appropriate converted or compiled ASN.1 definitions of the converted general ASN.1 definition for the received message out of the general message set. Further, the protocol handler selects the service logic programs having the requested functionality for processing the received message (S64) and provides the selected ASN.1 definitions to the selected service logic programs via a protocol-independent interface (S65).

Figure 7:
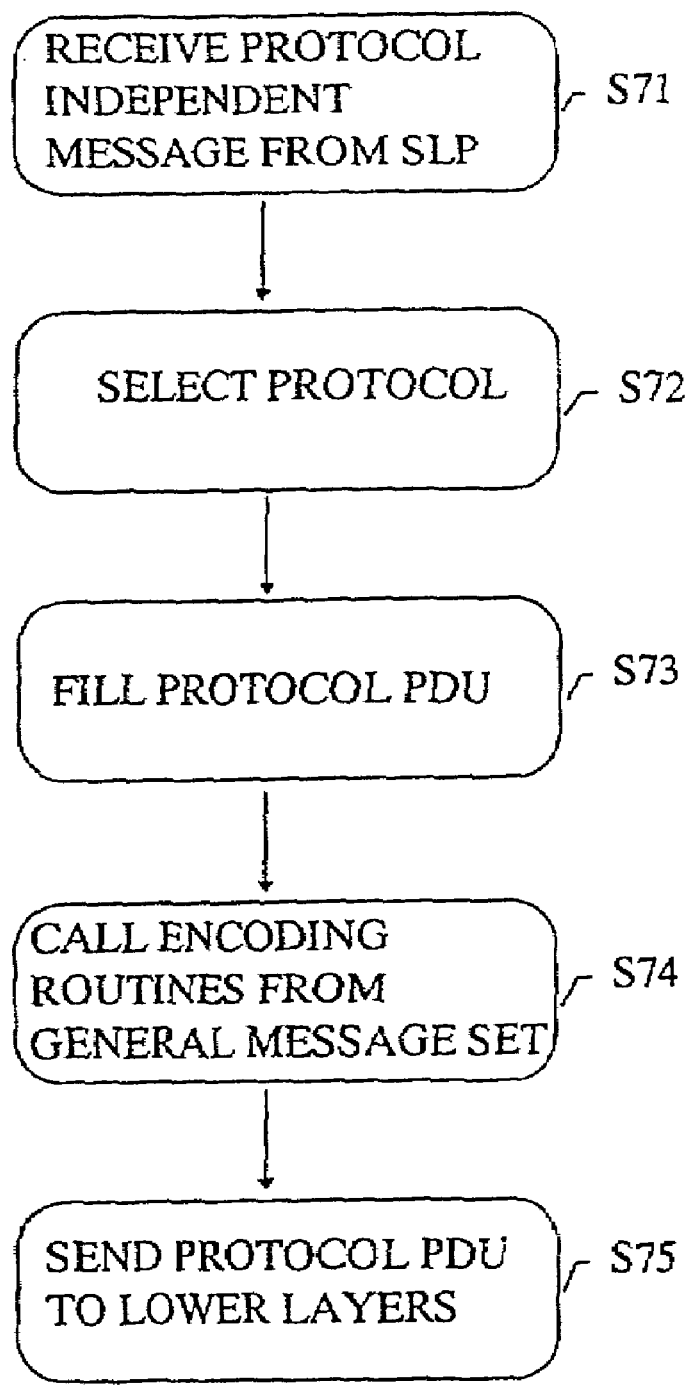
FIG. 7 shows a flowchart illustrating the process when a message is transmitted by the SCP network element according to the preferred embodiment of the present invention to an SSP network element.

Moreover, with respect to FIG. 7, in transmitting a message from the SCP network element to an SSP network element, that is in case the general protocol handler receives a protocol independent message from a service logic program (S71), the general protocol handler 3 selects the protocol to be used (S72) and fills the protocol PDU corresponding to the protocol independent message (S73). Then, the protocol handler 3 calls the appropriate encoding routines for the protocol PDU (S74) from the general message set and sends the protocol PDU to the lower layers (S75).

For example, if the SCP network element transmits the message "ConnectToResouce" to an SSP network element handling messages using the INAP for mobile network, the general protocol handler 3 selects the definition for mobile network INAP in the general protocol definition as set out in Annex 1 for encoding the protocol independent message "ConnectToResourcet".

Figure 8:
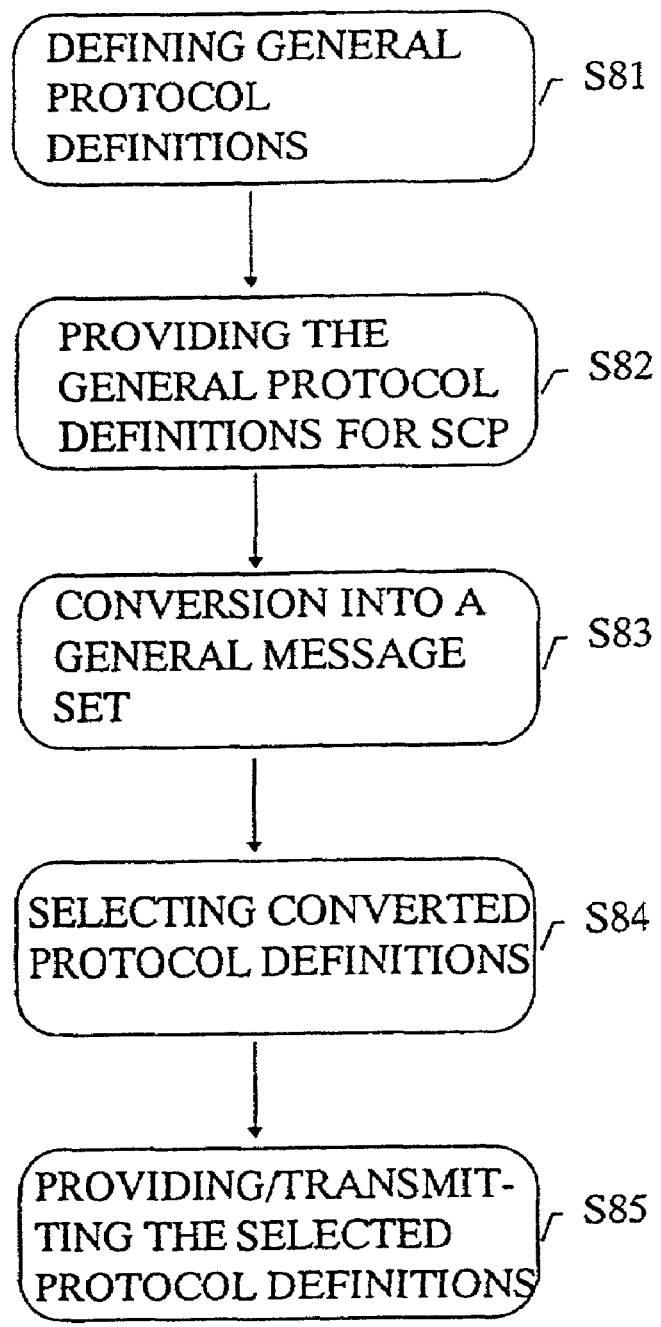
FIG. 8 shows a flowchart illustrating the operation according to the preferred embodiment of the present invention.
Figure 9:
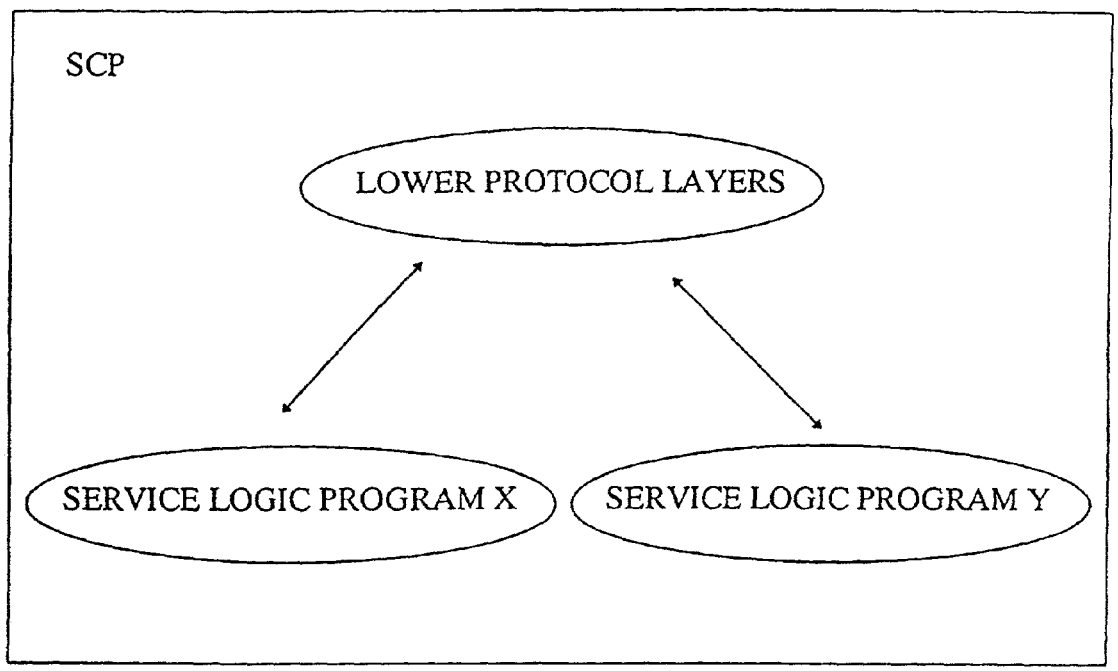
FIG. 9 shows a conventional architecture in an SCP network element.

With respect to FIG. 8, the overall operation according to the preferred embodiment of the present invention is shown. In step S81, the protocol definitions of the plurality of protocols are defined into the general protocol definitions for all possible messages transmitted to and from the SCP network elements and are provided to the respective SCP network elements in step S82. In the SCP network elements, the general protocol definitions are converted into the general message set as shown in step S83. When a message is received or has to be transmitted by the SCP network elements, converted protocol definitions corresponding to this message are selected from the general message set in step S84. Finally, in step S85, the selected converted protocol definitions are provided to the service logic programs or are transmitted.

This enables the service logic programs in the SCP network elements to register to only one message set, i.e. the general message set. Hence, changes in the message set are not visible to the service logic programs. Since there is only one protocol, i.e. a general protocol, from the viewpoint of the service logic programs, the number of used protocols does not change and the name of the protocol is stable.

In the above-described intelligent network system, the message set can, for example, be implemented as a header file in which the encoding and decoding routines are algorithmic or software functions, or as a dynamic linkable library such as a DLL file in Windows systems. Furthermore, the service logic programs can be implemented as executable binaries or code which is interpreted in runtime. The ASN.1 definitions are translated into the general message set and are used in all network elements which are going to communicate with each other, wherein the implementation can differ in the network elements but the definition has to be the same. In case of different definitions, the network elements would not understand each other. Finally, according to the intelligent network system, the general protocol handler is implemented as an executable binary or code which is interpreted in runtime. The general protocol handler is compiled by means of the message set or uses the message set as a dynamic library.

The present invention is not limited to the use in connection with protocols for mobile and fixed intelligent networks for processing phone calls but can be used in every protocol stack where ASN.1 is used in the representation layer, for example in connection with SNMPs (Simple Network Management Protocols) in LANs (Local Area Networks). That is, the intelligent network IN according to the above description can be replaced by a TCP/IP (Transmission Control Protocol/Internet Protocol) network which comprises network management stations and network elements. The network management stations execute management applications which monitor and control the network elements, wherein connectivity is provided by a TCP/IP stack. The network elements contain management agents which are responsible for performing the network management functions requested to them, wherein SNMP is used to communicate management information between the management applications and the agents. For example, a message transmitted by a network element can be a PDU "GetRequest" corresponding to the above-mentioned PDU "ConnectToResource".

Figure 5:
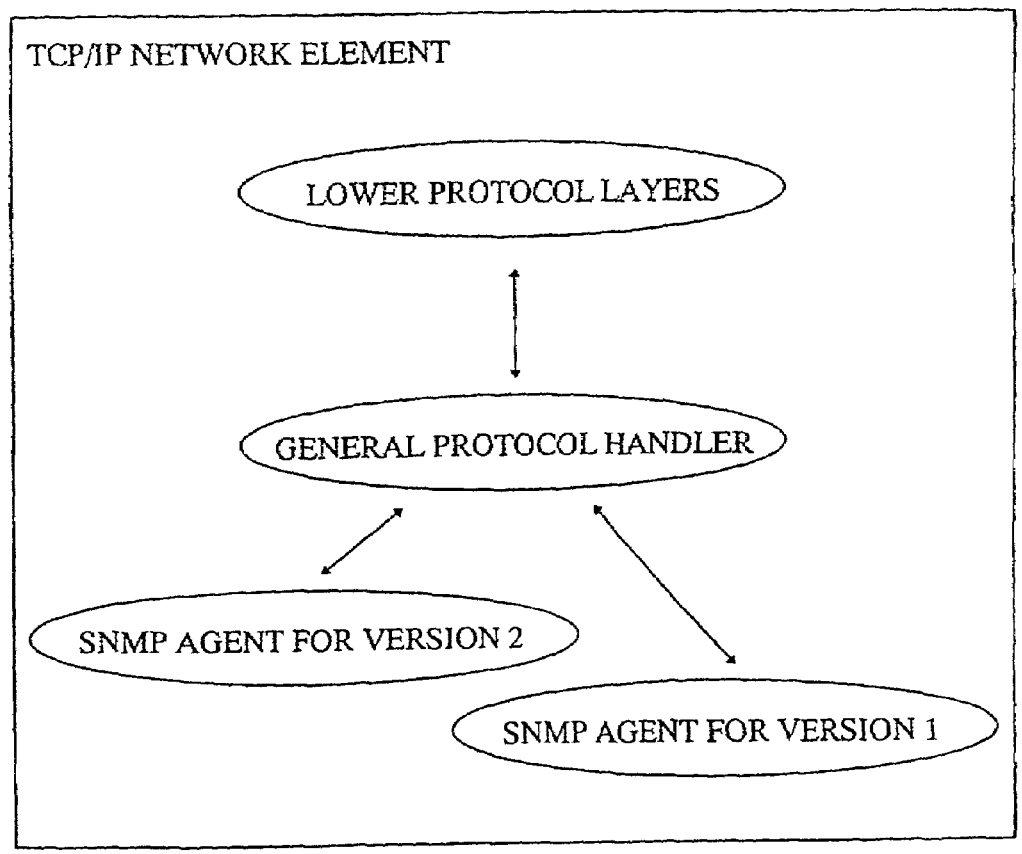
FIG. 5 shows an architecture of a TCP/IP network element in which the present invention can be applied.

In this context, FIG. 5 shows an architecture of a TCP/IP network element to which the present invention is applied. According to FIG. 5, a general protocol handler corresponding to the general protocol handler 3 in FIG. 4 communicates with lower protocol layers and SNMP agents for different versions. On one hand, the general protocol handler receives version independent messages to be transmitted from the SNMP agents and, on the other hand, selects SNMP agents for processing received version-specific messages and provides selected ASN.1 definitions for the received messages to the selected SNMP agents.

While the invention has been described with reference to a preferred embodiment, the description is illustrative of the invention and is not to be construed as limiting the invention. Various modifications and applications may occur to those skilled in the art without departing from the scope of the invention as defined by the appended claims.

ANNEX 1

Example of a general ASN.1 definition for message (PDU) "ConnectToResource":

```
DEFINITIONS::=
BEGIN
-- Definition for Mobile network INAP
MobileConnectToResourceArg ::= SEQUENCE {
ResourceAddress CHOICE {
                IpRoutingAddress [0] IPRoutingAddress,
                None                                 [3] NULL
                },
MobileAddition INTEGER (1...255),
extensions      [4] ExtensionArray          OPTIONAL,
}
```

-continued

```
-- Definition for Fixed network INAP
FixedConnectToResourceArg ::= SEQUENCE {
ResourceAddress CHOICE {
                IpRoutingAddress [0] IPRoutingAddress,
                None                               [3] NULL
                },
extensions      [4] ExtensionArray        OPTIONAL,
}
----------------------------------------------------------------------------------------
-- Common definitions for both protocols
IPRoutingAddress ::= CalledPartyNumber
ExtensionArray ::= SEQUENCE SIZE (1...numOfExtensions)
OF ExtensionField
ExtensionField ::= SEQUENCE {
ExType          INTEGER (1...255),
Criticality ENUMERATED {
                Ignore (0),
                Abort (1)
                } DEFAULT ignore,
value [1] ANY DEFINED by exType
}
END
```

The invention claimed is:

1. A network system comprising:
   at least one network element of a first type;
   at least one network element of a second type for transmitting messages to said first type network elements, each of said second type network elements using a specific protocol of a plurality of protocols for transmitting the messages,
   wherein said first type network elements are configured to process the received protocol-specific messages and to transmit messages to said second type network elements by using service logic programs included in each of said first type network elements; and
   a definition unit configured to define protocol definitions of said plurality of protocols, which protocol definitions are related to one message, into a general protocol definition for the message, and configured to provide general protocol definitions for all possible messages transmitted by said second type network elements and said first type network elements for each of said first type network elements,
   wherein each of said first type network elements comprises
   a conversion unit configured to convert the provided general protocol definitions into one general message set that is used in the respective first type network element, so that the service logic programs register to only this one general message set, and
   a selection unit configured to select converted protocol definitions in the converted general protocol definition for a received protocol-specific message and for a message to be transmitted by the respective first type network element out of the general message set, and configured to provide the selected converted protocol definitions for the received message to said service logic programs for processing the received message, and configured to transmit the selected converted protocol definitions for the message to be transmitted.

2. The system according to claim 1, wherein said definition unit defines, in the general protocol definitions, protocol definitions common for several protocol definitions.

3. The system according to claim 1, wherein said definition unit defines protocol definitions of a protocol for a mobile network and protocol definitions of a protocol for a fixed network in the general protocol definitions.

4. The system according to claim 1, wherein said selection unit selects the service logic programs used for processing the received message.

5. The system according to claim 1, wherein said selection unit receives the messages to be transmitted by said first type network elements from the service logic programs as protocol independent messages.

6. The system according to claim 1, wherein said selection unit provides an identifier for each converted protocol definition of the respective converted general protocol definitions in the general message set, which identifier indicates to which protocol of said plurality of protocols each converted protocol definition belongs.

7. The system according to claim 6, wherein said identifier is a prefix.

8. The system according to claim 1, wherein said selection unit provides the selected converted protocol definitions to said service logic programs via a protocol-independent interface.

9. The system according to claim 1, wherein said conversion unit converts general protocol definitions which are represented in ASN.1 definitions.

10. The system according to claim 9, wherein said conversion unit performs the conversion using a message set compiler.

11. The system according to claim 1, wherein said plurality of protocols comprises SS7 signaling protocols and TCP/IP signaling protocols.

12. The system according to claim 11, wherein said SS7 signaling protocols comprise INAP, MAP and CAMEL signaling protocols and different versions thereof.

13. The system according to claim 1, wherein said selection unit accesses encoding and decoding routines in the general message set.

14. The system according to claim 1, wherein the general message set includes encoding and decoding routines for said plurality of protocols.

15. The system according to claim 1, wherein said first type network elements are configured to process phone calls in mobile networks and in fixed networks.

16. A method of processing protocol-specific messages in a network element of a first type, wherein messages are transmitted to said first type network element by at least one network element of a second type, each of said second type network elements using a specific protocol of a plurality of protocols for transmitting the messages, and wherein, by using service logic programs included in said first type network element, the protocol-specific messages can be processed by said first type network element and messages can be transmitted by said first type network element to said second type network elements, said method comprising:
   defining protocol definitions of said plurality of protocols, which protocol definitions are related to one message, into a general protocol definition for the message,
   providing general protocol definitions for all possible messages transmitted by said second type network elements and said first type network element for said first type network element,
   converting the provided general protocol definitions into one general message set that is used in said first type network element, so that the service logic programs register to only this one general message set,
   selecting converted protocol definitions in the converted general protocol definition for a received protocol-specific message and for a message to be transmitted by the first type network element out of the general message set, and providing the selected converted protocol definitions for the received message to said service logic programs for processing the received message, and transmitting the selected converted protocol definitions for the message to be transmitted.

17. The method according to claim 16, further comprising: defining common protocol definitions in the general protocol definitions, the common protocol definitions being common for several protocol definitions.

18. The method according to claim 16, further comprising: defining protocol definitions of a protocol for a mobile network and protocol definitions of a protocol for a fixed network in the general protocol definitions.

19. The method according to claim 16, further comprising: providing an identifier for each converted protocol definition of the respective converted general protocol definitions in the general message set, which identifier indicates to which protocol of said plurality of protocols each converted protocol definition belongs.

20. The method according to claim 19, wherein said identifier is a prefix.

21. The method according to claim 16, wherein the service logic programs are selected for processing the received message.

22. The method according to claim 16, wherein the messages to be transmitted by said first type network element are presented by the service logic programs as protocol independent messages.

23. The method according to claim 16, wherein the selected converted protocol definitions are provided to said service logic programs via a protocol-independent interface.

24. The method according to claim 16, wherein the general protocol definitions are represented in ASN.1 definitions.

25. The method according to claim 24, wherein the ASN.1 definitions are converted using a message set compiler.

26. The method according to claim 16, wherein said plurality of protocols comprises SS7 signaling protocols and TCP/IP signaling protocols.

27. The method according to claim 26, wherein said SS7 signaling protocols comprise INAP, MAP and CAMEL signaling protocols and different versions thereof.

28. The method according to claim 16, wherein said selecting comprises accessing encoding and decoding routines in the general message set.

29. The method according to claim 16, wherein the general message set includes encoding and decoding routines for said plurality of protocols.

30. The method according to claim 16, wherein phone calls in mobile networks and in fixed networks can be processed by said first type network element.

31. A apparatus, comprising:
at least one network element of a first type;
at least one network element of a second type for transmitting messages to said first type network elements, each of said second type network elements using a specific protocol of a plurality of protocols for transmitting the messages,
wherein said first type network elements are configured to process the received protocol-specific messages and to transmit messages to said second type network elements by using service logic programs included in each of said first type network elements; and
defining means for defining protocol definitions of said plurality of protocols, which protocol definitions are related to one message, into a general protocol definition for the message, and for providing general protocol definitions for all possible messages transmitted by said second type network elements and said first type network elements for each of said first type network elements,
wherein each of said first type network elements comprises
a conversion means for converting the provided general protocol definitions into one general message set that is used in the respective first type network element, so that the service logic programs register to only this one general message set, and
a selection means for selecting converted protocol definitions in the converted general protocol definition for a received protocol-specific message and for a message to be transmitted by the respective first type network element out of the general message set, and for providing the selected converted protocol definitions for the received message to said service logic programs for processing the received message, and for transmitting the selected converted protocol definitions for the message to be transmitted.

* * * * *